UNITED STATES PATENT OFFICE.

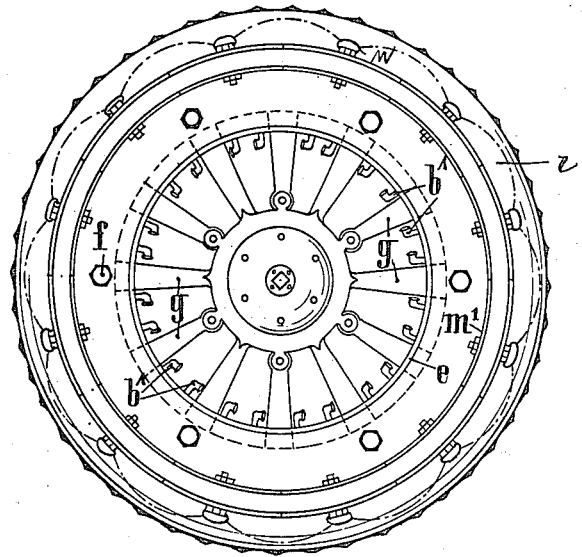

CHONON SCHRAGIN, OF BERLIN, GERMANY.

WHEEL-TIRE.

1,181,263.  Specification of Letters Patent.  Patented May 2, 1916.

Application filed August 7, 1912. Serial No. 713,698.

*To all whom it may concern:*

Be it known that I, CHONON SCHRAGIN, residing at Berlin, Germany, have invented an Improved Wheel-Tire, of which the following is a specification.

This invention relates to an automobile tire of novel construction having expansible cells in which a continuous ventilation and a constant exchange of warm and cold air automatically takes place, so that the resiliency of the tire is greatly increased and jolting is prevented.

In the accompanying drawing: Figure 1 is a side view of a wheel provided with a tire embodying my invention; Fig. 2 a sectional view of part of the tire; Fig. 3 a detail of the wheel rim, and Fig. 4 an enlarged cross section of Fig. 2.

The body $i$ of the tire-core contains a plurality of cavities or cross channels $a$, extending therethrough from side to side. Each channel is closed at its ends by leather or similar flexible heads $i'$ set into the channels, and which may be plaited if desired. The tire is furnished with a flexible covering $h$ which extends over the heads $i'$ so that in this way the channels are effectively closed and form a plurality of compressible air chambers within the tire. The channels are separated from each other by radial walls or partitions of the tire. Each channel $a$ communicates with the atmosphere by means of a radially disposed exhaust and intake tube $b'$ extending through the inner side of the channel and accommodated within corresponding bores $d$ of the felly $c$ and the metallic wheel rim $c'$ (Fig. 3). Tubes $b'$ extend a distance beyond the inner face of felly $c$, the free ends of the tubes being accommodated between the spokes $g$. These inner ends of the tubes are bent laterally in a direction opposite to that of the wheel travel, and are enlarged into a funnel shape, the mouths of the funnels being protected against dust and dirt by means of wire screens $b^2$. The tubes $b'$ are inserted subsequent to the fitting of the tire $i$ upon the wheel rim.

In use, the warmed air contained in channels $a$ is expelled therefrom through tube $b'$ when the channels arrive at their lowermost position, in which they are compressed by the load. When upon the cessation of such pressure, the channels expand into their normal form, the exterior cold air will be drawn into the same. In this way, there will take place a constant uniform exchange of cold and warmed air, resulting in a continuous ventilation and a high resiliency in the tire, while furthermore jolting is effectively prevented.

The ventilation and exchange of air are automatically regulated by the turning of the wheel, each rotation effecting a single air exhaust and air intake for each channel by means of bending the flaring ends of the tubes in a direction opposite to that of the travel, the ingress of water, dust and dirt is effectively prevented.

By my invention, various important advantages are obtained. Thus the frequent and tedious pumping of air and the resulting occasional bursting of the tire are prevented. So also the warm air contained in the tire, the temperature of which frequently rises in the tires heretofore known up to the burning degree, and which is therefore extremely injurious, is entirely removed, and a constant exchange of air is maintained. Finally, as the several cavities of the tire are not in intercommunication, and as each cavity is provided with its individual air supply, the danger that the entire tire may blow up is entirely obviated.

I claim:

1. In a tire, a core provided with a plurality of separate channels extending therethrough from side to side, radially disposed separation walls between the channels, flexible heads fitted into the ends of the channels, combined with a flexible covering mounted on the core and extending over the ends of said channels, and means for connecting each of the channels with the atmosphere, whereby each separate channel is enabled during the revolution of the tire to aspirate and thereby to maintain the air within the channel in a cool condition.

2. A tire provided with a plurality of separate channels extending therethrough from side to side, radially disposed separation walls between the channels, flexible heads fitted into the ends of the channels, a flexible covering mounted on the tire and extending over the ends of said channels, and an aspiration conduit in each separate channel, said aspiration conduit being disposed radially and adapted to freely discharge and draw in air.

CHONON SCHRAGIN.

Witnesses:
    WOLDEMAR HAUPT,
    HENRY HASPER.